Sept. 1, 1925.
W. H. WEATHERFORD
PAN LIFTER
Filed Jan. 28, 1925
1,551,592
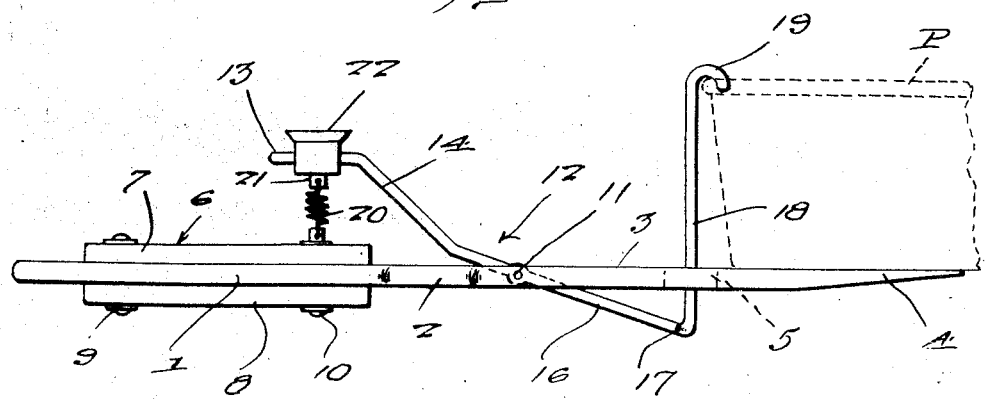
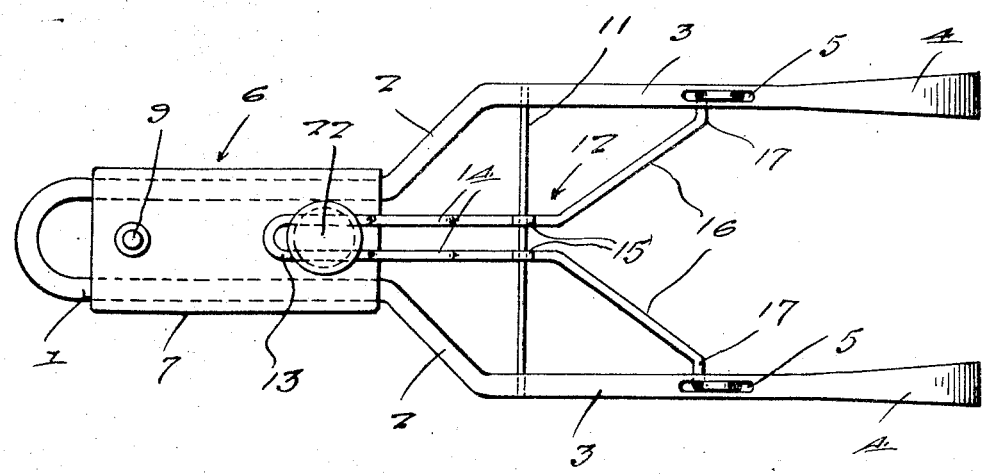

Patented Sept. 1, 1925.

1,551,592

UNITED STATES PATENT OFFICE.

WILLIAM H. WEATHERFORD, OF COVINGTON, KENTUCKY.

PAN LIFTER.

Application filed January 28, 1925. Serial No. 5,262.

*To all whom it may concern:*

Be it known that I, WILLIAM H. WEATHERFORD, a citizen of the United States, residing at Covington, in the county of Kenton and State of Kentucky, have invented certain new and useful Improvements in Pan Lifters, of which the following is a specification.

This invention relates to an improved device commonly known in the art as a pan lifter, and as is quite customary, the same embodies jaws for engaging the pan and an appropriate handle, the device, in effect, being a detachable handle for the pan, to enable it to be conveniently handled, when it is hot and it is desired to remove it from an oven or the like.

The object of the invention is to generally improve upon prior patented and marketed structures of this class, by providing one embodying a novel arrangement of details and parts, associated in a manner to provide a comparatively simple and inexpensive structure, which is highly practical for the purpose which it is intended to serve.

The features and advantages of the improved construction will become apparent from the following description and drawings.

In the accompanying drawings, forming a part of this application, and in which like numerals are employed to designate like parts throughout the same:

Figure 1 is a side elevation of a pan lifter constructed in accordance with the present invention.

Figure 2 is a top plan view of the device.

Referring to the drawings in detail, it will be observed that the improved device comprises a main supporting member, which includes a U-shaped portion 1, terminating in outwardly diverging portions 2, the ends of which are extended into spaced parallelism to form arms 3. The free ends of the arms are flattened, as indicated at 4. These widened ends constitute effective supporting surfaces for the pan P, indicated in dotted lines in Figure 1. Attention is directed to the fact that the intermediate portions of the arm 3 are provided with elongated slots 5, which serve a purpose to be hereinafter described. Referring now to the reduced U-shaped portion 1, it will be seen that a wooden block 6 is arranged to form a heat insulating handle. This block is preferably composed of upper and lower sections 7 and 8, clamped against opposite sides of the U-shaped portion 1 as shown in the drawing. Bolts 9 and 10 are preferably provided for clamping them tightly in place. Here, I would direct attention to the fact that the upper end of the bolt 10 is formed with an aperture, which serves in the manner to be later described. Also, it should be noted that the handle forming block 6 terminates in spaced relation from the bight portion of the U so as to form an eye for hanging the device upon a wall from a suspension hook or nail as is usual.

Disposed between the arms 3 is a cross rod 11, and pivotally mounted on the intermediate portion of this cross rod is a retaining arm, generally indicated by the reference character 12. By preference, this arm is composed of a single length of wire, which is bent between its ends, as at 13, to provide spaced branches 14, provided between their ends with pivot eyes 15. These portions 14 extend in a downwardly inclined plane, as indicated in Figure 1, while the bight portions extend in a substantially horizontal plane. The end portions thereof are extended in diverging relation, as indicated at 16, and then outwardly, as at 17, and then upwardly as at 18, the extremities being bent downwardly to form the hooks 19, to take over the rim of the pan. The upwardly extended portions 18 pass movably through the aforesaid slots 5. A coiled spring 20 is connected to the apertured end of the aforesaid bolt 10 and to the reduced portion 21 of a finger button 22. This finger button is provided with spaced parallel openings through which branches 14 of the arm 12 pass as indicated by dotted lines. The spring 20 is an expansion spring, and normally exerts a yieldable stress in an upward direction to move the portions 18 downwardly to cause an effective grip of the hooks 19.

In practice, the flat end portions 4 of the arm 3 are disposed beneath the bottom of the pan, as illustrated in Figure 1, and the button 22 is engaged and pressed downwardly to rock the arm 12 about its central pivot. In so doing, the hooks 19 are moved in a direction away from the rim of the pan. Sliding the portion 4 still further beneath the pan, and bringing the portions 18 of the arms 12 in close proximity to the rim of the pan, it is obvious that the hooks 19 can be conveniently placed over the rim as indicated. Upon releasing the button 22, the spring exerts an upward thrust upon the adjacent portion of the arm 12, closing the hooks firmly, to hold the pan in place. Now, the wooden handle 6 can be grasped so that the pan can be conveniently handled. With the arrangement shown, the portions 18 and hooks 19 are spaced apart a sufficient distance to engage the rim of the pan at circumferentially spaced points in a manner to prevent rocking of the pan about the flattened end portions 18. Of course, these flattened ends will be of a length to permit them to be slid well under the pan to prevent possible tilting.

It is thought that the foregoing description, taken in connection with the drawing, will enable persons skilled in the art to which the invention relates to obtain a clear understanding of the same. For this reason a more lengthy description is thought unnecessary.

Although I have shown and described the preferred embodiment of the invention, and utilized specific terms for defining the structure, it is understood that the invention is not to be limitaneously construed, for changes coming within the scope of the invention claimed may be resorted to, if desired.

I claim:

A pan lifter comprising a supporting member including spaced parallel arms adapted to extend beneath the bottom of a pan, a U-shaped portion, and a block carried thereby and constituting a handle, a cross rod extending between said arms, a retaining member pivotally mounted between its ends upon said cross rod, and provided at its one end with hooks disposed to take over the upper edge of the rim of the pan, a finger button carried by the opposite end of said member, and spring means interposed between and connected with said button and block.

In testimony whereof I affix my signature.

WILLIAM H. WEATHERFORD.